(12) United States Patent
Schafheutle et al.

(10) Patent No.: US 6,254,937 B1
(45) Date of Patent: Jul. 3, 2001

(54) WATER-DILUTABLE BINDER FOR "SOFT FEEL" LACQUERS

(75) Inventors: Markus A. Schafheutle; Birgit Anner, both of Graz; Anton Arzt, Tillmitsch; Julius Burkl; Gerlinde Petritsch, both of Graz; Joerg Wango, Wundschuh, all of (AT)

(73) Assignee: Vianova Resins AG, Werndorf (AT)

( * ) Notice: Subject to any disclaimer, the term of this patent is extended or adjusted under 35 U.S.C. 154(b) by 0 days.

(21) Appl. No.: 09/366,059

(22) Filed: Aug. 2, 1999

(30) Foreign Application Priority Data

Aug. 4, 1998 (AT) .................................................... 1343/98

(51) Int. Cl.$^7$ ................................................ C09D 175/00
(52) U.S. Cl. ................................. 427/388.2; 427/388.4; 427/389.7; 427/393.5; 427/343.6; 525/440; 525/457; 525/458; 525/456; 525/424; 525/428; 524/591
(58) Field of Search ................................. 525/440, 457, 525/458, 456; 524/591; 427/388.2, 388.4, 389.7, 393.5, 393.6

(56) References Cited

U.S. PATENT DOCUMENTS

| | | | | |
|---|---|---|---|---|
| 4,308,184 | * | 12/1981 | Thoma | 156/239 |
| 4,728,542 | * | 3/1988 | Nachtkamp | 427/389 |
| 5,059,639 | | 10/1991 | Ohkura et al. | |
| 5,569,707 | | 10/1996 | Blum . | |

OTHER PUBLICATIONS

Derwent Abstract of JP 52–155627 (Dec. 24, 199&); AN 1978–11306A, Section Ch, Week 197806.

* cited by examiner

*Primary Examiner*—Patricia A. Short
(74) *Attorney, Agent, or Firm*—Frommer Lawrence & Haug LLP

(57) ABSTRACT

Soft feel lacquers comprising water dilutable binders A which possess functional groups, selected from hydroxyl, amino and carboxyl groups, and of curing agents B which have functional groups capable of reacting with the functional groups of the components A, and forming chemical bonds as cross-linking sites, wherein at least one of the components A and B contains a sufficient quantity of aromatic constituent units to ensure that the mass fraction of the aromatic constituent units in relation to the solid matter in the combination of binder and curing agent is not less than 3%.

12 Claims, No Drawings

WATER-DILUTABLE BINDER FOR "SOFT FEEL" LACQUERS

RELATED APPLICATIONS

This application claims priority to Austrian application No. 1343/98, filed Aug. 4, 1998, herein incorporated by reference.

BACKGROUND OF THE INVENTION

1. Field of the Invention

This invention relates to binders for water-dilutable "soft feel" lacquers which remain stable on being exposed to UV radiation.

2. Background of the Invention

When coating hard substrates such as plastics it is frequently desirable sought to achieve a "soft feel" by means of a coating in such a manner that while the surface has a soft "feel" the mechanical and chemical stability of the coating is not impaired in comparison to that of the customary coatings.

Preferred binders for such "soft feel" lacquers are to be found in the segment of polymers displaying a low glass transition temperature. This means on one hand that the cross-linking density must be high enough to prevent or minimize any deterioration of the chemical and mechanical properties as far as possible, and on the other hand it must be sufficiently low to permit the manifestation of the effects of the macroscopic properties of the low glass transition temperature.

In the case of polyurethanes, for example, polyether polyols or polyester polyols which have a purely aliphatic character are frequently used as such a segment with a low glass transition temperature. Especially for top coat applications the use of aromatic components is generally avoided, as they would render the finished coating photosensitive and may lead to secondary reactions such as yellowing and embrittlement.

However, it has been established that coatings made with binders and curing agents with aliphatic constitutional units, especially polyurethane and polyester which have purely aliphatic constitutional units, become rapidly tacky on being exposed to UV radiation and lose their mechanical stability.

OBJECT OF THE INVENTION

One object of the invention was to find binders for water-dilutable "soft feel" lacquers which remain stable on being exposed to UV radiation.

Surprisingly, it was discovered that combinations of binders A and curing agents B, provided at least one of the two components A and B contain aromatic structural elements, result in coatings with excellent stability against UV radiation. This was all the more unexpected as aromatic constitutional units usually reduce the resistance to light or UV radiation.

SUMMARY OF THE INVENTION

The subject matter of the invention are combinations of binder A and curing agent B for soft feel coatings, comprising water-dilutable binders A with functional groups selected from hydroxyl, amino and carboxyl groups, and curing agents B which contain functional groups capable of reaction with the functional groups of component A and capable of forming chemical bonds as cross-linking points, wherein at least one of the components, A or B, contains aromatic structural components in such a quantity that their mass fraction, related to the mass of solids, amounts to at least about 3%, preferably at least 5% and in particularly preferred cases at least about 10%.

DESCRIPTION OF THE PREFERRED EMBODIMENTS

All known classes of polymers featuring functional groups, selected from hydroxyl, amino, amide and carboxylic acid groups, are suitable as binder A. Examples of suitable polymers containing hydroxyl groups include polyacrylate polyols, polyester polyols, polyether polyols and polyurethane polyols. Examples of polymers containing amino groups include polyether amines, polyiminoalkylene amines, polyamide amines and polyurethane ureas. Examples of polymers for containing carboxyl groups include polyester polyols, polyurethane polyols and copolymers of acrylic or methacrylic acids. Mixtures of all the polymers described above are also contemplated. In this context, the preferred specific amount of substance of hydroxyl, amino, or carboxyl groups in the respective polymers should be about 0.01 to about 2 mmol/g, with the polymers possessing an average of at least about 1.5, preferably between about 1.8 and about 2.5 and in particularly preferred cases 1.9 to 2.2 functional groups per molecule.

Preferred binders A are combinations of polymers containing hydroxyl groups, with particular preference to polyurethanes A1, and polymers containing amino groups, with particular preference to polyurethane ureas A2. Polyester-polyols are especially preferred constituents of the polyurethanes A1 and A2; however, others, for example, polyether polyols, polycarbonate polyols, polybutadiene polyols, polyisoprene polyols and polyesteramide polyols may also be used.

The hydroxyl number of the preferred polyester urethanes A1 amounts to about 10 to about 60, is preferred between 20 to 50 and receives particular preference between 35 to 45 mg/g; their glass transition temperature is from about −70 to about −30° C., preferably between −60 to −40° C. and particularly, at about −50° C.

The hydroxyl number of the polyester urethane ureas A2 preferably amounts from about 0 to about 10, and is particularly preferred between 0 and 5mg/g. Their amine number amounts from about 1 to about 15, preferably from 3 to 10 and particularly between 4 and 8 mg/g. The glass transition temperature of the components A1 is always lower than the glass transition temperature of A2, a difference in the glass transition temperature of about 5 K is preferred while a difference between about 7 and about 20 K receives particular preference.

Within the scope of the invention it is also possible to produce the binders A having segments with at least two different glass transition temperatures and differing functional groups in such a manner that the glass transition temperatures exhibit a difference of at least about 5 K. These A components with a block structure may in such a case possess, for example, hydroxyl as well as amino groups.

The mass ratio of the binder components A1 and A2 (solid matter) is from about 4:6 to about 9:1, preferably from 5:5 to 8:2, with particular preference from about 6:4 to 7:3.

The hydroxyl number is defined by the German Industrial Standard (DIN) 53 240 as the quotient of that mass $m_{KOH}$ of potassium hydroxide exhibiting the same number of hydroxyl groups as the sample to be tested and the mass $m_B$ of this sample (mass of the solid matter in the sample in the case of solutions or dispersions) and its customary unit of measurement is "mg/g".

The amine number is defined by the German Industrial Standard (DIN) 53 176 as the quotient of the mass $m_{KOH}$ of potassium hydroxide which requires the same amount of acid for neutralization as the sample to be tested and the mass $m_B$ of this sample (mass of the solid matter in the sample in the case of solutions or dispersions) and its customary unit of measurement is "mg/g".

The preferred component A 1, hereinafter designated "soft component", comprising of polyurethane containing hydroxyl groups, may be produced in the known manner from aliphatic, aromatic or mixed aliphatic and aromatic polyols with an average of at least two hydroxyl groups per molecule and multifunctional aliphatic, aromatic or mixed aliphatic and aromatic isocyanates whereby the amount of substance of the isocyanate groups in the mixture of the reactants is less than that of the hydroxyl groups. The required dilutability by water is achieved by means of incorporating anionogenic groups, i.e. components which carry acid groups which are neutralized at least partially prior to or during the dispersion in water by the addition of neutralizing agents, such as aqueous alkali or amines, and are thus transformed into anions. As already mentioned, the preferred polyurethanes A1 are those derived from polyester urethanes which are accessible by the polyaddition of polyesters A11 containing hydroxyl groups and multifunctional isocyanates A12. In turn the polyesters A11 are produced in the known manner by means of polycondensation of polyols A111 and multifunctional acids A112 or their ester-forming derivatives, for which purpose it is preferred to use a mixture of at least two aliphatic polyols A111.

The preferred polyols for A111 are aliphatic dihydroxy compounds. Polyhydric polyols (with three or more hydroxyl groups per molecule, e.g. trimethylolethane, trimethylolpropane, pentaerythritol and sorbitol) can be used in this mixture up to a mass fraction of about 20% in the mixture of A 111. The preferred mass fraction is up to 10%, particularly preferred is up to 5%. Particularly suitable aliphatic polyols A111 are the linear and branched dihydroxy compounds from 2 to 8 carbon atoms such as glycol, 1,2- and 1,3-propanediol, 1,4-butanediol, 1,6-hexanediol, neopentylglycol, diethylene glycol and triethylene glycol. The mass fraction of the branched dihydroxy compounds should not exceed about 5%.

As A112 compounds, aliphatic linear or cyclic carboxylic acids are preferred with particular preference for dicarboxylic acids. Suitable examples are linear aliphatic dicarboxylic acids with 2 to 40 carbon atoms, such as succinic acid, glutaric acid, adipic acid, pimelic acid as well as suberic, azelaic acid and sebacic acid, 1,2-cyclohexanedicarboxylic acid as well as the dimeric fatty acids made from unsaturated fatty acids or their mixtures. A low proportion of aromatic di- and polycarboxylic acids may also be added (with a mass fraction in the acid component up to about 10%). Examples for these are phthalic acid, iso- and terephthalic acid, trimellitic and trimesic acids as well as benzophenonetetracarboxylic acid.

In place or in addition of the compounds A111 and A112 also the hydroxy acids A114, preferably hydroxycarboxylic acids may be used by each having at least one hydroxyl and one acid group, or their ester-forming derivatives. Particular preference is given to the monohydroxymonocarboxylic acids. Suitable compounds in this class A114 are gamma-hydroxybutyric acid, delta-hydroxyvaleric acid, epsilon-hydroxycaproic acid, lactic acid, oligo- and polyesters from these acids or their mixtures. Particularly preferred is the technically available poly-epsilon-capriolactone.

The preferred synthesis of the polyester A111 is carried out in two stages. In the first stage merely the difunctional polyol A111 is condensed with the difunctional, linear, branched or cyclic carboxylic acids A112 into a linear polyester with a hydroxyl number from about 20 to about 100, preferably from 30 to 70, and especially preferred from 40 to 60 mg/g. In the second stage A111 is condensed further with additional polyol, wherein at this stage also polyols with higher functions may be used. At the end of this second stage the hydroxyl number of the polyester will be from about 50 to about 200 mg/g, preferably from 60 to 160, and especially preferred from 70 to 130 mg/g. The polyester of this second stage is then reacted with a compound A113 which has at least two hydroxyl and one acid group and optionally a further polyol A111 as well as the multifunctional isocyanate A12 to form the addition product A1.

Preferred compounds as A113 are aliphatic dihydroxycarboxylic acids such as dimethylolpropionic acid and tartaric acid. Also acids with at least two amino groups or with at least one amino and one hydroxyl group can be used, e.g. 2,4-diaminobutyric acid.

The multifunctional isocyanates A12 may be aliphatic, a mixture of aliphatic and aromatic or aromatic. Preferred are difunctional aliphatic linear, branched and cyclic isocyanates such as 1,4-diisocyanatobutane, 1,6-diisocyanatohexane, 1,5-diisocyanato-2-methylpentane, 2,2,4- and 2,4,4-trimethyl-1,6-diisocyanatohexane, 1,12-diisocyanatodecane, 1,4-diisocyanatocyclohexane, isophorone-diisocyanate, bis-(4-isocyanatocyclohexyl)methane and the uretdiones, allophanates and biurets derived from these. To a minor extent (up to 10% of the mass of the isocyanate components) also isocyanates with three and more functions such as the isocyanurates which are derived from the diisocyanates which were already referred to may be used. Less preferred is the use of aromatic or mixed aromatic and aliphatic isocyanates such as tetramethylxylylenediisocyanate, bis-(isocyanatophenyl)-methane, toluylene-diisocyanate and 1,5-diisocyanatonaphthalene.

The acid groups of this polyesterurethane are neutralized by the addition of alkali or amines, preferably by a tertiary amine, and the neutralized addition product A1 can be subsequently dispersed in water, with a mass fraction of solids at approx. 30 to 70%, preferably approx. 45 to approx. 65%. The synthesis of the polyester and the subsequent conversions are preferably carried out in the absence of organic solvents.

The component A2, preferably a polyurethane urea which is hereinafter also referred to as the "elastic component", is preferentially synthesized in three steps. In the first step initially a polyester A21, with a hydroxyl number from about 10 to about 90, preferably 30 to 70 and especially preferred of from 40 to approx. 60 mg/g is produced from aliphatic polyols A211 with multifunctional carboxylic acids A212 by esterification and elimination of water in the substance or in the melt. This intermediate, optionally in the presence of small quantities of an inert solvent, such as n-methylpyrrolidine, is converted by adding component A213 which has at least two hydroxyl and one acid group, and optionally a further polyol A211 and a stochiometric surplus of a multifunctional isocyanate A22 into the adduct A23 containing isocyanate groups, which is neutralized by a tertiary amine A24 and dispersed in water, and then chain-extended to a polyurethane urea by the addition of a polyamine, preferably of a diamine A25. In doing so the concentration is selected such that the mass fraction of solid matter amounts from about 20 to about 60%, preferably 25 to approx. 50% and in the particularly preferred cases amounts to lies between from approx. 32 to 40%.

As polymer polyol A211, also polypropylene glycol, polytetrahydrofurandiol or polybutadienediol can be used. Available for this is e.g. polypropylene glycol 1010 or 2020 or polybutadienediol PolyBD R-45 HT, Poly BD R-20LM (®Elf Atochem), polyisoprenediol such as PolyIp (®Elf Atochem) or their perhydrated variations such as Polytail-H or EPOL (both from (®Elf Atochem) may be used.

Otherwise the polyols A211, the multifunctional carboxylic acids A212, the compounds A213 and the isocyanate A22 are selected from the same lists as the corresponding compounds A111, A112, A113 and A12. As tertiary amines preferably those were selected which have no further functional groups. Examples of suitable amines A24 are triethylamine, tri-n- and isopropylamine, tri-n- and isobutylamine, trioctylamine and tridodecylamine.

The amines A25 used for the chain-extension step have at least two primary amino groups, or at least one primary and at least one secondary, amino groups, or at least two secondary amino groups; those with two primary amino groups being preferred. Preference is given amino groups which are attached to an aliphatic carbon atom. Suitable amines are especially aliphatic primary diamines such as ethylenediamine, polyoxyalkylene or polyiminoalkylene diamines which have alkylene groups with preferably 2 to 4 carbon atoms, such as diethylene triamine, triethylene tetramine, etc.; 1,2- and 1,3-diaminopropane, 1,4-diaminobutane, 1,2- and 1,4-diaminocyclohexane, 2,4,4- and 2,2,4-trimethylhexanediamine, isophorone diamine and mixed aliphatic-aromatic diamines such as tetramethylxylylenediamine.

The "soft feel" lacquer, in accordance with the invention, is produced by adding suitable cross-linking agents B to the components A1 and A2.

All low molecular compounds which react with hydroxyl, amino or carboxyl groups to form a chemical bond between the residues of the binder and the cross-linking agent as well as a volatile condensate by means of addition or condensation are suitable as cross-linking agents. In the case of hydroxyl and amino groups, especially multifunctional isocyanates are suitable, especially those which are dilutable by water due to the inclusion of a anionic or non-ionic hydrophilic groups, or in the case of higher temperatures reactive cross-linking agents such as acid anhydrides, aminoplast resins, blocked isocyanates and similar compounds. In case of carboxylic functional groups, the use of cross-linking agents with epoxide or aziridine groups is preferred. For components A with hydroxyl and amino groups, unblocked multifunctional isocyanates, especially those with hydrophilic modification, are preferred as curing agent B. If the components of the binders A1 and A2 contain no or only low quantities of aromatic constitutional units, preference is given to aromatic isocyanates. Likewise, mixtures of aromatic and aliphatic isocyanates may be used. Among the multifunctional isocyanates suitable for the invention, mixed isocyanurates of the aliphatic and aromatic diisocyanates are particularly preferred, for example those accessible by the joint conversion of aromatic diisocyanates such as TDI (toluylene diisocyanate) or MDI (bis(4-isocyanatophenyl) methane), with aliphatic diisocyanates such as HMDI (hexamethylene diisocyanate, 1,6-diisocyanatohexane), tetramethylxylylene diisocyanate (TMXDI) or IDPI (isophorone diisocyanate). These isocyanates can subsequently be hydrophilically modified in the known manner by reaction with anionogenic compounds such as dimethylolpropionic acid or other compounds in accordance with A113 or by non-ionic hydrophilic compounds such as polyoxyethylene glycol.

The preferred manner of producing the soft feel lacquers from the binders A and the curing agent B is by distributing the pigments and, if applicable, the matting agents within the component A and formulating the mixture as a lacquer ready for application by the addition of thickener and other customary additives. Particularly preferred is a formulation in which thickener is added together with further quantities of the binders A1 and A2. Another preferred embodiment comprises distribution of the pigment in one of the two binder components A1 and A2 and the delusterant in the other, thus ensuring a fine distribution in the binders. It has turned out to be advantageous to add the pigment component to the soft component A1 and the delusterant to the elastic component A2. Other additives such as wetting, leveling and dispersing agents and defoamers are added to at least one of the components A1 and A2 respectively. The mass fraction of solids in the finished lacquer also comprising the curing agent amounts to about 35 to about 65%, preferably 40 to 60% and particularly preferred 45 to 57%. The mass fraction of the solvent in the finished lacquer is typically below about 6, preferably below 4%.

In order to modify the surface properties, especially the so-called grip (haptics), waxes may be added to the lacquers produced in accordance with the invention which can, for example increase the scratch-resistance of the coating further.

As already referred to by means of the lacquers made available by the invention, coatings may be produced on hard substrates of all kinds which feel soft on the surface and thereby create, e.g. a non-skid coating. These lacquers are particularly suitable for the coating of plastics, metals, ceramic materials and glass.

EXAMPLES

The invention is explained by means of the following examples. In this context the following additional definitions will be used:

The acid number in accordance with DIN 53 402 is defined as the quotient of that mass $m_{KOH}$ of potassium hydroxide which is required to neutralize the sample to be investigated and the mass $m_B$ of this sample (mass of the solids in the sample from solutions and dispersions); expressed in the customary unit of "mg/g".

All numbers with the unit "%" refer to values of mass fraction (g/100 g) unless expressly stated otherwise.

Example 1
Production of a "Soft" Polyester Urethane A1
1.1 Polyester

A mixture of 32.2 kg diethylene glycol, 16.42 kg ethylene glycol and 72 kg of adipic acid to which 330 g of dibutyltin dilaurate was added was warmed up to 150° C. The emerging water was removed by the addition of xylene and the temperature was raised to 220° C. in the course of three hours. The mixture was retained at this temperature until an acid number below 3 mg/g was reached. The hydroxyl number of the polyester obtained amounted to 50 mg/g, at 23° C. on a shear gradient of 25 $s^{-1}$ a viscosity of about 10 Pa·s was measured.

1.2 Polyester Urethane 2,064 g of the polyester obtained was heated together with 22 g of 1,6-hexanediol, 36.5 g n-methyl pyrrolidone and 150 g dimethylol propionic acid to 130° C., subsequently 273 g of 1,6-diisocyanato hexane were added in the course of 20 minutes and the temperature was maintained for about a further hour. On cooling down to 80° C. it was neutralized by adding 66 g of triethylamine and turned into a fine dispersion in about 1,950 g water with a mass fraction of solids of approx. 55%. This dispersion had a viscosity of approx. 1,000 mPa·s at 23° C. and a shear gradient of 25 s$^{-1}$. The hydroxyl number amounted to approx. 27 mg/g, the acid number approx. 28 mg/g (in respective relation to the solid matter in the solution).

Example 2
Production of a "Soft" Polyester Urethane A1
9.8 kg of the polyester from example 1.1 was mixed with 345 g trimethylol propane, 25 g ethylene glycol, 109 g of 1,6-hexanediol and 741 g dimethylol propionic acid and heated up to 130° C. On reaching this temperature 1,730 g 1,6-diisocyanato hexane were added in approx. 20 minutes and the temperature was maintained for about a further hour. On cooling down to 80° C. it was neutralized by adding about 290 g of dimethylethanol amine and turned into a fine dispersion in approx. 10 kg water with a mass fraction of solids at approx. 55%. This dispersion had a viscosity of approx. 1,000 mPa·s at 23° C. and a shear gradient of 25 s$^{-1}$. The hydroxyl number amounted to approx. 40 mg/g, the acid number approx. 27 mg/g (in respective relation to the solid matter in the solution).

Example 3
Production of an "Elastic" Polyester Urethane Urea A2
3.1 Polyester
A polyester was prepared from a mixture of 48.2 kg of 1,6-hexanediol, 34.15 kg adipic acid and 18.53 kg of isophthalic acid to which 20 g of dibutyltin dilaurate was added, at a temperature that was increased from 150° C. to 220° C. in the course of three hours while the water from the reaction was removed. The polyester has an acid number of less than 3 mg/g and a hydroxyl number of approx. 80 mg/g.
3.2 Polyester Urethane Urea
2,065 g of the polyester was dissolved with 37 g of 1,6-hexanediol and 112 g dimethylol propionic acid in 1,200 g n-methylpyrrolidone at 50° C. 540 g of 1,6-diisocyanato hexane was added to the clear solution and the mixture was allowed to react until the mass fraction of the diisocyanate groups fell to below 0.9%. Subsequently 55 g triethylene amine were added and the mixture was dispersed in 3,300 g of water. A solution of 66 g of isophorone diamine in 700 g water was vigorously stirred into this dispersion. A fine-particle dispersion with a mass fraction of solids of approx. 35% and a viscosity of approx. 300 mPa·s (23° C., 25 s$^{-1}$) was obtained. The hydroxyl number within the measuring tolerance was 0 and the amine number amounted to approx. 5 mg/g. The solvent content of the dispersion amounted to approx. 15%.

Example 4
Production of a "Soft Feel" Lacquer
4.1 With Aromatic Structure in the Binder
To 17.8 g of the dispersion from Example 2 were added 0.3 g of a wetting agent (®Additol XL 250 of Vianova Resins GmbH) and 0.5 g of a dispersion agent (®Additol VXW 6208) as well as 1.5 g of a carbon black pigment (Spezialschwarz 4 of Degussa GmbH) were also added and subsequently homogenised in a bead mill.
22.5 g of the dispersion from Example 3 was diluted with 18.5 g water which contained 0.3 g of a defoamer (®Additol XW 375) and 3.75 g each of the two matting agents (OK 412 of Degussa GmbH and ®Pergopak M4 of Martinswerk) and homogenized for about 30 minutes with a high-speed stirrer.
The two mixtures were added and homogenized together with a mixture of 30 g of the dispersion from Example 2, 0.3 g of a wetting agent (®Byk 346 of Byk GmbH) and 0.5 g of a thickener (®Viscalex HV 30 of Allied Colloids). To this finished mixture of the binder (approx. 100 g) 10 g of a hydrophilically modified isocyanate, based on 1,6-diisocyanato hexane with an isocyanate mass fraction in the solids of approx. 17% (®Bayhydur 3100 of Bayer AG), was added and the mixture was set for an efflux time of 180 seconds (DIN-EN-ISO beaker with a 4 mm nozzle at 23 EC) by the addition of more water. The mass fraction of solids of the lacquer amounted to approx. 53%. After a storage period of approx. 120 minutes the residual lacquer had to be disposed of (end of the so-called "pot life"). No further increase of the viscosity was observed.
4.2.1 Purely Aliphatic System
To 62 g of the dispersion from Example 2 were added 0.3 g of a wetting agent (®Additol XL 250) and 0.5 g of a dispersion agent (®Additol VXW 6208) as well as 1.5 g of a carbon black pigment (Spezialschwarz 4 of Degussa GmbH) and subsequently homogenized in a bead mill. To this undercoat lacquer were added 18.5 g water, 0.3 g of a defoamer (®Additol XW 375) and 3.75 g each of the two matting agents (OK 412 of Degussa GmbH and ®Pergopak M4) and it was homogenized for about 30 minutes with a high-speed stirrer. Finally, 0.3 g of a wetting agent (®Byk 346) and 0.5 g of a thickener (®Viscalex HV 30) were added. The mixture was set for an efflux time of 180 seconds (DIN-EN-ISO beaker with a 4 mm nozzle at 23° C.) by the addition of more water. 10 g of a curing agent (®Bayhydur 3100) were stirred into this lacquer.
4.2.2 Purely Aliphatic System
The same formulation as 4.2.1. was used, but in place of the dispersion of Example 2 the dispersion of Example 1 was used.
4.3 Purely Aliphatic System
The lacquer was synthesized as in Example 4.2.1, however, instead of an aliphatic curing agent (®Bayhydur 3100) 17 g of an aromatic curing agent (®Cythane 3174 of Cytec) was added in the form of a solution in 20 g of N-methylpyrrolidone to the undercoat lacquer and homogenized for about 30 minutes with a high-speed stirrer. The mixture was also set for an efflux time of 180 seconds by the addition of more water.
These lacquers (Example 4.1–4.3) were used to coat substrates of plastic (ABS, PMMA, polystyrene, polycarbonate, flame-treated polypropylene, hard PVC, nylon 66), untreated steel and steel sheets which were treated with a normal primer. After an air drying of approx. 5 minutes the boards were dried for 30 minutes at 80° C. The layer thickness of the dried film was 30 to 35 μm.
Resistance to chemicals was assessed on the basis of the coated steel sheets. At 1,000 double exposures in a so-called "Crockmeter" no chemical attacks were observed in contact with water, acetone and diluted ammonia and only limited attacks with xylol.
The resistance to UV radiation was measured by using a commercially available irradiation device. While in the case of purely aliphatic "soft feel" system (Examples 4.2.1 and 4.2.2) the surfaces changed within 24 to 48 hours with the coating and became tacky and slippery, the lacquers in accordance with the invention (Examples 4.1 and 4.3) displayed no changes even after irradiation periods in excess of 700 hours.
The above description of the invention is intended to be illustrative and not limiting. Various changes or modifications in the embodiments described herein may occur to those skilled in the art. Those changes can be made without departing from the scope or spirit of the invention.

What is claimed is:

1. Soft feel lacquers comprising water dilutable binders A which posses functional groups selected from hydroxyl, amino and carboxyl groups, and curing agents B which have functional groups capable of reacting with the functional groups of the components A, and forming chemical bonds as cross-linking sites, wherein at least one of the components A and B comprises a quantity of aromatic constituent units such that the mass fraction of the aromatic constituent units, in relation to the solid matter in the combination comprising of binder and curing agent, is not less than about 3%, and wherein the binders A are combinations of polyurethanes A1 having a glass temperature of from about −70 to about −30° C. and containing hydroxyl groups, and of polyurethane ureas A2 containing amino groups.

2. Soft feel lacquers according to claim 1, wherein the polyurethanes A1 are polyester urethanes containing hydroxyl groups.

3. Soft feel lacquers according to claim 1, wherein the polyurethanes ureas A2 are polyester urethane ureas containing amino groups.

4. Soft feel lacquers according to claim 1, wherein the curing agent B is an unblocked, optionally hydrophilically modified, isocyanate with at least two isocyanate groups per molecule.

5. Soft feel lacquers according to claim 1, wherein the polyurethanes A1 containing hydroxyl groups posses a hydroxyl number from approx. 10 to approx. 60 mg/g.

6. Soft feel lacquers according to claim 1, wherein the polyurethane ureas A2 possess a hydroxyl number approx. from 0 to 10 mg/g, an amine number between about 1 to about 15 mg/g and a glass temperature between about −20 to about −60° C.

7. Soft feel lacquers according to claim 1, wherein the glass temperature of the components A1 is at least about 5 K below the glass temperature of the components A2.

8. Soft feel lacquers according to claim 1, wherein the mass ratio of the binder components A1 and A2, in relation to the solid matter amount is, from about 4:6 to about 9:1.

9. Soft feel lacquers according to claim 1, wherein the quantity of aromatic components is such that their mass fraction, related to the mass of solids, is at least 3%.

10. Soft feel lacquers according to claim 8, wherein the mass ratio is 5:5 to 8:2.

11. A method for coating a hard substrate selected from the group consisting of plastics, metals, ceramic materials and glass which comprises applying a soft feel lacquer according to claim 1.

12. Coatings with soft feel characteristics which comprise a lacquer according to claim 1.

* * * * *